United States Patent Office 3,291,770
Patented Dec. 13, 1966

3,291,770
COATINGS FROM PARTIAL CONDENSATION OF ALLYLATED PHENOLIC RESIN WITH EPOXY RESIN
Norman G. Gaylord, New Providence, and Alfred M. Tringali, Middlesex, N.J., assignors to Interchemical Corporation, New York, N.Y., a corporation of Ohio
No Drawing. Filed Mar. 7, 1962, Ser. No. 177,960
4 Claims. (Cl. 260—33.4)

This invention relates to synthetic resins. More particularly, it relates to a new synthetic resin and to novel coating compositions containing said new resin.

Solutions of the novel resins in organic solvents provide coating compositions which display excellent properties as protective and decorative coatings, especially inside can coatings for food and beverage cans.

The provision of suitable coatings for the insides of metal containers housing foods such as fish foods which are especially reactive with such coatings has existed as a problem in the canning art for many years. In the past, cured coatings of phenolic resins have provided the best solution to this problem. Phenolic resins are fast curing and the cured films have several outstanding properties which make them useful as can linings. These coatings are hard, resistant to sulfide staining (tuna staining) by food products, resistant to softening in the presence of oils and fatty acids, resistant to essential oil, resistant to blushing on processing in steam or water and insoluble in solvents.

Cured coatings of phenolic resins remain deficient in many properties desirable for inside can linings. Coatings of phenolic resins are deficient in adhesion to metal surfaces. Good adhesion is necessary because the coating material is usually applied before the container is fabricated. During fabrication, the container is subjected to a considerable amount of bending and other mechanical forces which act to separate the coating from the surface unless adhesion is good. In addition, phenolic resin coatings are generally lacking in flexibility. In fact, they display a brittleness which necessitates their application at low film weights. This results in poor continuity and deformed areas as well as the film being easily scratchable. Further, phenolics are sensitive to oily, oxidized, or otherwise contaminated tin plate. Finally, most phenolic resins tend to give a characteristic flavor to food products, particularly those which contain appreciable amounts of free water. Products containing carbohydrates have also been found to pick up phenolic flavors.

There have now been discovered new resins which when dissolved in an organic solvent provide inside can coatings for food and beverage cans that overcome to a large extent the above mentioned deficiencies of phenolic resins coatings while maintaining the desirable properties of such coatings.

Copending application, Serial No. 177,959 filed by the inventors of this invention on or about the same date as this application is also directed to resins which overcome the deficiencies of phenolic resins in inside can coatings. Said copending application considers thermosetting resins which are the condensation products of polyalkylol phenols and certain ethoxyline compounds.

It has likewise been discovered that the acid catalyzed condensation products of certain ethoxyline resins with allylated polyalkylol phenols or with mixed allylated and non-allylated polyalkylol phenols in the presence of an aliphatic alcohol provides new resins which when dissolved in organic solvents provide very desirable inside can coatings that overcome the deficiencies of coatings containing phenolic resins.

The new resins of this invention are prepared by the condensation, in the presence of an acid catalyst and an aliphatic alcohol, of an allylated polyalkylol phenol selected from the group consisting of compounds having the formula

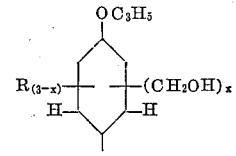

where R is a member of the group consisting of alkyl and hydrogen and $x$ is a number from 2 to 3 inclusive and tetramethyloldiallyloxydiphenyl dialkyl methane, and an ethoxyline resin. It has further been found that novel resins having the above described desirable properties may also be produced upon the condensation with said ethoxyline resins, in the presence of an acid catalyst and an aliphatic alcohol, of mixtures of the above described allylated polyalkylol phenols and nonallylated polyalkylol phenols having the general formula,

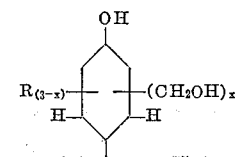

where R is a member of the group consisting of alkyl and hydrogen and $x$ is a number from 2 to 3 inclusive.

The organic solvent soluble thermosetting resins of this invention provide a significant and patentable advance over the existing art wherein "cold blends" of allylated and non-allylated phenolic and epoxy or ethoxyline resins are cured to provide protective coatings. In coatings made by such conventional cold blending techniques, the phenolic and ethoxyline resins are not reacted with each other until the blend of these resins is cured by the application of heat to form insoluble set products. This invention now provides a thermosetting organic solvent soluble resin having both ethoxyline and phenolic components which is formed by the acid catalyzed condensation of an ethoxyline resin with an allylated alkylol phenol. The thermosetting resin of this invention is stable and has a long shelf life. When dissolved in a volatile organic solvent, the thermosetting resin provides a novel curable coating composition which upon baking produces protective and decorative coatings superior to the above described blended coatings.

In preparing these novel resins, Epon ethoxyline resins, particularly "Epon 1004," "Epon 1007" and "Epon 1009" are preferably used. The term Epon is a registered trademark used by the Shell Chemical Corporation to designate a class of ethoxyline resins formed by the reaction Bisphenol A and epichlorohydrin. By referring to Epon resins in the specification, it is not intended to limit the practice of this invention to only these resins. It is merely intended to refer to these Epon resins as a convenient commercial source of the ethoxyline resins preferred in the practice of this invention. It will be obvious to those skilled in the art upon reading the following description and structural formulas of the preferred ethoxyline resins that there exist other commercial resins having the preferred structure and properties. Ethoxyline resins having these desired properties include other commercial resins such as the Ciba "Araldite," the Jones-Dabney "Epi-Rez," the Reichold "Epotif," and the Bakelite "ERL" series.

The ethoxyline resins used in this invention are conventionally prepared by reacting a polyhydric phenol, particularly Bisphenol A a commercial product consisting of the mixed isomers of dihydroxydiphenyl dimethyl methane with epichlorohydrin. By regulating the proportions of these two reactants, the molecular size and the molecular structure of the ethoxyline resins produced may be controlled. By reacting increased quantities of Bisphenol A, the high molecular weight solid ethoxyline resins are produced. Epons 1004, 1007 and 1009 are such high molecular weight ethoxyline resins. Their properties are shown in Table I, which further suggests alternative resins having substantially the same properties.

art that other related homologs may be used. It has been found that there is a marked tendency for the allylated polyalkylol phenols to undergo homopolymerization to form high molecular weight phenolic resins which become insoluble and non-reactive with our ethoxyline components. The butanol substantially delays such homopolymerization by reacting with the methylol groups on the phenol to produce butoxymethyl groups. While pre-

| Preferred Resin | Viscosity | Melting Point | Epoxide, Equiv. wt. | Hydroxyl Equiv. wt. | Av. Mol wt. | Hydroxyl Functionality | Epoxides Per Mol. | Alternative Resin having same properties. |
|---|---|---|---|---|---|---|---|---|
| Epon 1004 | Q-U* | 95-105 | 870-1,025 | 175 | 1,350 | 7.75 | 1.3-1.6 | ERL 2003. Araldite 6084. Epi-Rez 530. Epotuf 6304. |
| Epon 1007 | Y-Z$_1$* | 127-133 | 1,550-2,000 | 200 | 2,625 | 13.0 | 1.3-1.7 | Araldite 6097. Epi-Rez 540. Epotuf 6307. |
| Epon 1009 | Z$_2$-Z$_5$* | 145-155 | 2,400-4,000 | 220 | 3,875 | 17.5 | 1.0-1.6 | Araldite 6099. Epi-Rez 550. Epotuf 6309. |

*Gardner-Holdt scale.

Epons 1004, 1007 and 1009 have substantially the following structure

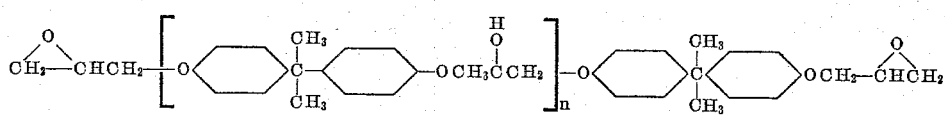

The number of repeating unit in the structure determines the average molecular weight. The value of $n$ varies from as low as 3 in the lower molecular weight Epon 1004 to as high as 14 in the higher molecular weight Epon 1009.

While the above structural formulas show the Epon resins to consist of diepoxy molecules, it should be remembered that neither the Epon resins nor other commercially available resins consist entirely of molecules of a single type. Consequently no Epon resin is entirely a diepoxy resin. Side reactions in the preparation of these resins—such as termination of the chain with a bisphenol molecule instead of a epichlorohydrin, or conversion of epoxide to glycol—reduce the epoxide content. However, for the sake of convenience in description, the Epon resins are referred to and shown as substantially diepoxy resins.

For the allylated polyalkylol phenol, either allylated trimethylol phenol or allylated dimethylol-p-creso is preferred. Tetramethyoldiallyloxydiphenyl dimethyl methane has also been used to produce resins having our desired properties. It will be understood that related homologs such as allylated dimethylol phenol or allylated dimethylol-o-cresol among others can readily be used and it is intended that the appended claims will cover such homologs.

Methylon 75109 is used as a source of allylated polyalkylol phenol in the examples which follow. This composition is a mixture of allylated mono-, di- and trimethylol phenol, a major portion of which is trimethylol phenol; it is described in U.S. Patent No. 2,579,330, particularly Examples XIII and XIV thereof.

It is to be understood that the compositions of this invention may contain non-allylated polyalkylol phenols mixed with the allylated polyalkylol phenols. Such non-allylated materials include trimethylol phenol, dimethylol-p-cresol, dimethylol-o-cresol, dimethylol phenol and dimethylol-p-t-butyl phenol.

The presence of an aliphatic alcohol, during the condensation reaction is very important. While it is preferred to use n-butanol, it will be obvious to those skilled in the venting homopolymerization of the polyalkylol phenol, these butoxymethyl groups are reactive with the hydroxy groups on the ethoxyline resin, thereby permitting condensation of the polyalkylol phenol and the ethoxyline resins.

Without absolute commitment on the theory involved, it is believed that in the condensation of the allylated polyalkylol phenol with the ethoxyline resin, one of the reactions, probably the major one, may be represented as follows,

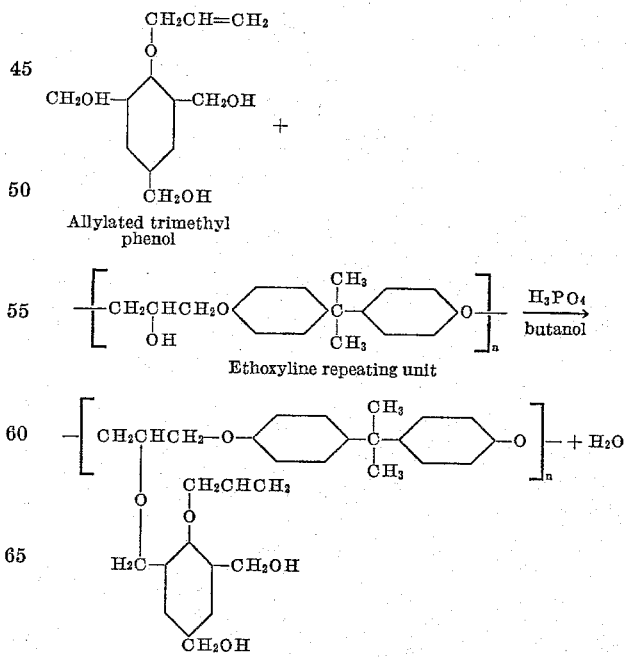

The reaction with para methylol group occurs as frequently or more frequently than the reaction with the ortho group shown above. The unreacted methylol groups are capable of reacting with hydroxyl groups in other Epon units and therefore act as crosslinking sites. In the presence of acid, the terminal epoxy groups in the Epon resin are capable of polymerizing in the usual manner, and further, the methylol groups in the phenolic nucleus are capable of opening and reacting with the epoxy groups.

The following examples will illustrate the practice of this invention.

EXAMPLE 1

*Allylated trimethylol phenol*

1215 g. of 37% formaldehyde are added to a mixture of 470 g. of phenol, 220 g. NaOH and 470 g. of water at room temperature under a nitrogen atmosphere. 1005 g. of allyl bromide is then added and the mixture is stirred for 8 hours. The organic layer is separated from the water layer and washed several times with water and several times with petroleum ether. 50 cc. of benzene are added and the water in the mixture is azeotropically distilled by heating the mixture to a boil at 90° C. and maintaining the mixture at a boil for 2 hours, during which time the temperature rises to 120° C. The benzene is then distilled by heating the mixture under vacuum for one hour at 120° C. The product is a light yellow viscous liquid.

EXAMPLE 2

| | G. |
|---|---|
| (A) Allylated trimetholyl phenol (described in Example 1) | 200 |
| (B) Epon 1009 | 800 |
| (C) Xylene | 667 |
| (D) n-Butanol | 333 |
| (E) 85% $H_3PO_4$ | 10 |
| (F) Xylene | 333 |
| (G) n-Butanol | 167 |

(B) is dissolved in (C) and (D). (A) and (E) are added and the mixture is heated to boiling at 109° C. The mixture is maintained at boiling for 3 hours during which time the water of condensation is azeotropically distilled and the boiling temperature rises to 135° C. (F) and (G) are added and the mixture is filtered while hot through a Buchner funnel. The product has a 36.7% solids content by weight and a viscosity of U on the Gardner-Holdt scale.

To a portion of the resulting resin solution there is added 1% of $H_3PO_4$ on solids basis and then the solution is reduced to roller coating viscosity (e.g. 34 to 40 sec. on a #4 Ford cup at 77° F.) with a solvent mixture consisting 2:1:1 xylol: butanol:isophorone. The solution is roller coated on 0.25 pound grade of electrolytic tin plate panels to give a dry film weight of 3.5 to 4.0 milligrams per square inch (calculated). The films were also roller coated on black iron panels in the same manner. After curing by baking at 216° C. for 12 minutes the films have good fabrication and steam processing resistance, good resistance to staining by tuna fish and good alkali pasteurization resistance. The cured films are then subjected to the following tests.

Steam processing resistance is determined by contacting the coating with a steam at 121° C. Films prepared in the above example withstood 60 minutes contact without showing any appreciable discontinuity of film or film blush.

Alkaline pasteurization is determined by exposure to an aqueous solution of potassium hydroxide (300 p.p.m. KOH) at 710 ° C. Films prepared in accordance with the above example withstood 30 minutes exposure without showing any appreciable discontinuity of the film or film blush.

By good fabrication resistance it is meant that the panels coated with the cured film can be fabricated into can ends without seriously disrupting the film.

Can ends fabricated from the coated panels and having the coating inside the can were very resistant to staining by tuna fish that had been processed in the can at 121° C. for 90 minutes.

Films prepared from the resin of this experiment were also cured on white enamel panels. These panels showed very slight discoloration. Such discoloration will not affect the desirability of these films for decorative and protective coatings, particularly for coatings for the insides of food cans. Taken as a whole, the results of the above tests indicate that cured films of the novel resins of this invention are very desirable protective and decorative coatings, particularly for the insides of food containers.

EXAMPLE 3

*Allylated dimethylol-p-cresol*

Part A.—Dimethylol-p-cresol is prepared by the following procedure. 2700 g. of molten p-cresol are added to a solution of 1100 g. of NaOH in 2750 g. of water. After 20 minutes, 4150 g. of 37% formaldehyde is added while the temperature is maintained at 30° C. A solid mass is formed. 6000 cc. of hot water are added and the mixture is neutralized with 314 ml. of concentrated $H_3PO_4$ and an amount of HCl necessary to effect such neutralization. The mixture is filtered, washed, and then dried at 45° C. in a forced air oven for 24 hours.

Part B.—138.4 g. of 98.5% NaOH are dissolved in 613 g. of $H_2O$ under a nitrogen atmosphere. 520 g. of the product of Part A are added. The mixture is heated to 60° C. and 370 g. of allyl bromide are added over a period of 15 minutes. The mixture is then maintained at 60° C. for an additional 2 hours. The mixture shows an organic layer and a water layer. The organic layer is extracted from the mixture by a 2:1 ratio, xylene:butanol mixture. The butanol and xylene is vacuum distilled leaving an almost solid material. The product is then washed in petroleum ether. The product has a 45.8% solids content by weight. Infrared analysis shows unsaturation and no phenolic hydroxyl groups.

EXAMPLE 4

| | G. |
|---|---|
| (A) Allylated dimethyl-p-cresol (prepared in Example 3) | 337.5 |
| (B) Epon 1009 | 373.4 |
| (C) Xylene | 230 |
| (D) n-Butanol | 114.9 |
| (E) 85% $H_3PO_4$ | 5 |

(B) is dissolved in (C) and (D). (A) is added and the mixture is heated to 77° C. (E) is added and the mixture is heated to boiling at 100° C. The mixture is maintained at boiling for 5 hours, during which time, the water of condensation is azeotropically distilled and the boiling temperature rises to 124° C. The product has a 42.6% solids content by weight and a viscosity of 31.6 poises.

Cured films of this resin in a solution of 2 parts by weight xylene per 1 part n-butanol were prepared and tested in acccordance with the procedure described in Example 2. The properties of these films were found to be better than the properties of the films prepared in Example 2. Cured films of this resin provide excellent protective and decorative coatings, particularly for the inside of food containers.

EXAMPLE 5

228 grams of dihydoxydiphenyl dimethyl methane (known commercially as Bisphenol A) is added to a solution 80 g. of NaOH in 800 ml. of water under a nitrogen atmosphere. The mixture was maintained under a nitrogen atmosphere for 3 hours. 324 g. of 37% formaldehyde is then added at room temperature over a 20 minute period, after which the mixture is heated to and maintained at 30–35° C. for 5½ hours. 214 g. of n-butanol are added and the mixture is cooled to 15° C. 242 g. of allylbromide are added over a 5 minute period.

The mixture is then stirred for 20 hours at room temperature, after which 214 g. of xylene are added. The organic layer is then separated by a separating funnel. The product has a 53.3% solids content by weight.

EXAMPLE 6

|   |   | G. |
|---|---|---|
| (A) | Allylated tetramethyloldihydroxydiphenyl dimethane prepared in Example 5 | 516.8 |
| (B) | Epon 1009 | 800 |
| (C) | Xylene | 456 |
| (D) | n-Butanol | 227 |
| (E) | 85% $H_3PO_4$ | 10 |
| (F) | Xylene | 333 |
| (G) | n-Butanol | 167 |

(B) is dissolved in (C) and (D). (A) and (E) are added and the mixture is heated to boiling at 100° C. The mixture is maintained at boiling for 5 hours, during which time, the water condensation is azeotropically distilled and the boiling temperature rises to 124° C. (F) and (G) are added and the mixture is filtered while hot through a Buchner funnel. The product has a 39.1% solids content by weight and a viscosity of V–W on the Gardner-Holdt scale.

Cured films of this resin in a solution of 2 parts by weight xylene per 1 part n-butanol provide excellent good protective and decorative surface coatings.

EXAMPLE 7

|   |   | G. |
|---|---|---|
| (A) | Methylon 75108 | 140 |
| (B) | Epon 1009 | 560 |
| (C) | Xylene | 467 |
| (D) | n-Butanol | 233 |
| (E) | 85% $H_3PO_4$ | 7 |

(B) is dissolved in (C) and (D). (A) and (E) are added and the mixture is heated to boiling at 118° C. The mixture is maintained at boiling for 5 hours, during which time, the water of condensation is azeotropically distilled and the boiling temperature rises to 125° C. The product has a 38.5% solids content by weight and a viscosity of Y on the Gardner-Holdt scale.

Cured films of the resin in a solution of 2 parts by weight of xylene per 1 part n-butanol were prepared and tested in accordance with the procedure described in detail in Example 2. The cured films were found to be as good as or superior to the cured films of Example 2, with the exception of the tuna staining test wherein, slight staining appeared on the coated tin. (The black iron panels were not affected). This slight staining does not affect the desirability of the cured films as protective coatings. In addition, the coatings of this resin showed usual resistance in the Oxygen-Spinach test. In this test, can ends fabricated from the coated panels and having the coating inside the can were very resistant to staining by spinach that has been processed for 60 minutes at 116° C. Cured films of the resins provide excellent protective and decorative coatings particularly for the inside of food containers.

EXAMPLE 8

|   |   | G. |
|---|---|---|
| (A) | Methylon 75108 | 140 |
| (B) | Epon 1004 | 560 |
| (C) | Xylene | 467 |
| (D) | n-Butanol | 233 |
| (E) | 85% $H_3PO_4$ | 7 |

(B) is dissolved in (C) and (D). (A) and (E) are added and the mixture is heated to boiling at 115° C. The mixture is maintained at boiling for 5 hours, during which time, the water condensation is azeotropically distilled and the boiling temperature rises to 125° C. The product has a 49.9% solids content by weight and a viscosity of U on the Gardner-Holdt scale.

Cured films of the resin in a solution of 2 parts by weight of xylene per 1 part of n-butanol were prepared and tested in accordance with the procedure described in detail in Example 2. The cured films were found to be as good as or superior to the cured films of Example 2, with the exception of the tuna staining test wherein slight staining appeared on the coated tin. (The black iron panels were not affected). This slight staining does not affect the desirability of the cured films as protective coatings. Cured films of the resin provide excellent protective and decorative coatings, particularly for the inside of food containers.

EXAMPLE 9

373.4 g. of Epon 1009 are dissolved in 319.7 g. of xylene and 159.9 g. of n-butanol. 110.2 g. of dimethylol-p-cresol (prepared in accordance with Example 3, Part A) and 40.2 g. of allylated dimethylol-p-cresol (prepared in accordance with Example 3, Part B) are added to the mixture and the mixture is heated to 80° C. 5 g. 85% $H_3PO_4$ are added and the mixture is heated to boiling at 114° C. The mixture is maintained at boiling for 5.5 hours, during which time, the water of condensation is azeotropically distilled and the boiling temperature rises to 128° C. The product has a 40% solids content by weight and a viscosity of Y+½ on the Gardner-Holdt scale.

Cured films of the resin in a solution of 2 parts by weight of xylene per 1 part n-butanol were prepared and tested in accordance with the procedure described in detail in Example 2. The cured films were found to be superior to those of Example 2. Cured films of the resins provide excellent protective and decorative coatings, particularly for the insides of food containers.

EXAMPLE 10

|   |   | G. |
|---|---|---|
| (A) | Methylon 75108 | 210 |
| (B) | Epon 1009 | 490 |
| (C) | Xylene | 467 |
| (D) | n-Butanol | 233 |
| (E) | 85% $H_3PO_4$ | 7 |

(B) is dissolved in (C) and (D). (A) and (E) are added and the mixture is heated to boiling at 112° C. The mixture is maintained at boiling for 5 hours, during which time, the water of condensation is azeotropically distilled and the boiling temperature rises to 124° C. 400 g. of a 2:1 ratio xylene:butanol solution are added and the mixture is filtered while hot through a Buchner funnel. The product has a 46.5% solids content by weight and a viscosity of 63.4 poises.

Cured films of the resin in an organic solvent provide protective and decorative coatings which, while not attaining the excellent properties of those in Example 9, still provide desirable protective and decorative coatings for the insides of metal food containers.

EXAMPLE 11

Part A

|   |   | G. |
|---|---|---|
| (A) | 97% NaOH | 660 |
| (B) | Ice | 6840 |
| (C) | p-Cresol | 1620 |
| (D) | 37% formaldehyde | 2490 |

(A), (B), (C) and (D) are mixed and maintained at 3° C. for 16 hours, after which, the mixture is maintained at room temperature for an additional 72 hours. Carbon dioxide is passed through the mixture until a pH of 9 is reached. The product is separated by means of a Buchner funnel and washed 3 times with water. The product is then dried for 2 days at 45° C. and 2 days at 60° C.

average molecular weight of 1300 to 4000, an epoxide equivalent of 870–4000 and the general formula

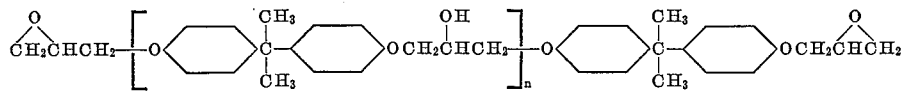

Part B

A mixture of 660 g. of NaOH, 6840 g. of ice, 1620 g. of p-cresol and 2490 g. of 37% formaldehyde is maintained at 3° C. for 16 hours and then at room temperature for 72 hours. 1815 g. of allyl bromide are added and the mixture is maintained at room temperature for 60 hours. 2080 g. of a 2:1 xylene: butanol solution are added and the organic layer is removed by siphoning. Water in the organic product is removed by azeotropic distillation.

Part C 700 g. of Epon 1007 are dissolved in 787 g. of a 2:1 xylene:butanol solution. 100 g. of the product of Part A and 378 g. of the product of Part B are added. 8.7 g. of 85% $H_3PO_4$ are then added. The mixture is then azeotropically distilled at 116°–129° C. to remove water. The mixture is then cooled and 500 g. of a 2:1 xylene: butanol mixture are added. The product is separated by filtering. The product has a 34.5% solids content and a viscosity of H on the Gardner-Holdt scale.

Cured films of the product in an organic solvent provide protective and decorative coatings which, while not attaining the excellent properties of those in Example 9, still provide desirable protective and decorative coatings for the insides of metal food containers.

While there have been described what are considered to be the preferred embodiments of this invention, it will be understood that the practice of this invention is not limited to the resins and coatings described in the specific examples but that various modifications may be made therein without departing from the scope of the invention as it is defined in the appended claims.

What is claimed is:

1. A method of preparing organic solvent soluble thermosetting resins which comprises condensing at a temperature below 135° C. an ethoxyline resin having an average molecular weight of 1300 to 4000, an epoxide equivalent of 870–4000 and the general formula where $n$ is a number from 3 to 14 inclusive with an allylated polymethylol phenol selected from the group consisting of compounds having the general formula

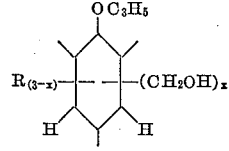

where R is a member of the group consisting of alkyl and hydrogen and $x$ is a number from 2 to 3 inclusive and tetramethyloldiallyloxydiphenyl dialkyl methane by heating said reactants in the presence of an acid catalyst and an alkanol.

2. The method of claim 1 wherein said allylated polymethylol phenol is allylated trimethylol phenol.

3. The method of claim 1 wherein said allylated polymethylol phenol is allylated dimethylol-p-cresol.

4. The method of claim 1 wherein said allylated polymethylol phenol is a major portion of allylated trimethylol phenol and minor portions of allylated mono-methylol phenol and dimethylol phenol.

References Cited by the Examiner

UNITED STATES PATENTS 2,458,796  1/1949  Ott et al. _____ 260—43
2,774,748  12/1956  Howard et al. _____ 260—45.5

OTHER REFERENCES

E. S. Narracott: British Plastics, vol. 28, No. 6, June 1955, pages 254–55.

"Epoxy Resins" (Lee et al.), published by McGraw-Hill, 1957, pages 277–279 relied on.

C. E. Schildknecht: Polymer Processes, Interscience Publishers Inc., N.Y. (1956), pages 450–52, 459 and 473 relied upon.

MORRIS LIEBMAN, *Primary Examiner.*

ALEXANDER H. BRODMERKEL, *Examiner.*

J. W. BEHRINGER, J. E. CALLAGHAN,
*Assistant Examiners.*